(12) United States Patent
Nie

(10) Patent No.: US 12,453,503 B2
(45) Date of Patent: Oct. 28, 2025

(54) SQUEEZE-TYPE ELECTRODE CONNECTOR

(71) Applicant: SHENZHEN UPNMED EQUIPMENT CO., LTD, Shenzhen (CN)

(72) Inventor: Lin Nie, Shenzhen (CN)

(73) Assignee: SHENZHEN UPNMED EQUIPMENT CO., LTD, Shenzhen (CN)

( * ) Notice: Subject to any disclaimer, the term of this patent is extended or adjusted under 35 U.S.C. 154(b) by 456 days.

(21) Appl. No.: 18/085,723

(22) Filed: Dec. 21, 2022

(65) Prior Publication Data

US 2024/0000360 A1    Jan. 4, 2024

(30) Foreign Application Priority Data

Jul. 1, 2022  (CN) .......................... 202210774297.1

(51) Int. Cl.
*A61B 5/28*       (2021.01)
*A61B 5/254*      (2021.01)

(52) U.S. Cl.
CPC ................ *A61B 5/28* (2021.01); *A61B 5/254* (2021.01)

(58) Field of Classification Search
CPC .......... A61B 5/271; A61B 5/273; A61B 5/274; A61B 2562/221; A61B 2562/225; A61B 2562/227
See application file for complete search history.

(56) References Cited

U.S. PATENT DOCUMENTS 6,487,430 B1 *  11/2002  Henderson ............. A61B 5/274
                                                      600/394

FOREIGN PATENT DOCUMENTS

| CN | 101999896 A | * | 4/2011 | .......... A61B 5/0408 |
| CN | 206252499 U | * | 6/2017 | |

* cited by examiner

*Primary Examiner* — Eun Hwa Kim
(74) *Attorney, Agent, or Firm* — HOWARD M COHN and Associates, LLC

(57) ABSTRACT

A squeeze-type electrode connector, relating to a technical field of electrodes, includes a shell and a clamping portion. The shell includes a connecting portion with a cavity defined therein. The connecting portion is made of an elastic material. The clamping portion includes a first metal sheet and a second metal sheet disposed on two sides of an interior of the cavity. A through-hole is defined through the first metal sheet. The first metal sheet is in staggered contact with the second metal sheet. The second metal sheet overlaps a part of the through-hole, so as to allow the through-hole to clamp an electrode sheet.

7 Claims, 4 Drawing Sheets

SQUEEZE-TYPE ELECTRODE CONNECTOR

TECHNICAL FIELD

The present disclosure relates to a technical field of connectors, and in particular to a squeeze-type electrode connector.

BACKGROUND

Electrocardiogram (ECG) monitors are practical precision medical instruments in hospitals for monitoring status of patients status in real time. The ECG monitors have functions of collection, storage, intelligent analysis and early warning of ECG information. Moreover, the ECG monitors have characteristics of precise monitoring and touch screen control, therefore being simple and convenient.

As medical industry rapidly advances, there is a great demand for accessories used to measure ECG data. ECG cables are used most commonly in the medical industry. However, there are many outstanding problems in the use of the ECG cables, such as low service life, inconvenient operation, high manufacturing cost etc. Clips and snap buttons for the ECG cables in related art use springs, and accordingly easily drop off during use. For example, a clip is clamped over an electrode sheet during use, and a movement of a body of a patient may cause the clip to drop off, thereby failing to meet user requirements.

SUMMARY

An objective of the present disclosure is to provide a squeeze-type electrode connector, including a shell and a clamping portion.

The shell includes a connecting portion with a cavity defined therein. The connecting portion is made of an elastic material.

The clamping portion includes a first metal sheet and a second metal sheet, and the first metal sheet and the second metal sheet are disposed on two sides of an interior of the cavity. A through-hole is defined on the first metal sheet. The first metal sheet is in staggered contact with the second metal sheet. The second metal sheet overlaps a part of the through-hole, so as to allow the through-hole to clamp an electrode sheet.

Optionally, the through-hole has an approximately circular shape or an oval shape.

Optionally, an arc-shaped notch is defined at an end of the second metal sheet in contact with the first metal sheet.

Optionally, the connecting portion has a circular external shape or an oval external shape.

Optionally, the cavity has a circular shape.

Optionally, the shell is integrally formed.

Optionally, the elastic material is one of thermoplastic polyurethanes (TPU), thermoplastic elastomer (TPE) and highly elastic silica gel.

Optionally, a wire tail is disposed on the connecting portion, where the wire tail is integrally injection molded with the connecting portion. An end of the wire tail is connected to a conducting wire.

Compared with related art, the squeeze-type electrode connector of the present disclosure has following beneficial effects.

According to the present disclosure, the squeeze-type electrode connector includes the shell and the clamping portion. The connecting portion integrally injection molded with the highly elastic material is cooperated with the clamping portion that is capable of performing back-to-back movement or face-to-face movement as the connecting portion is squeezed and rebounds. As such, there is no need of the springs and the snap buttons used in the related art, thereby effectively reducing the process difficulty and the manufacturing cost. Moreover, the squeeze-type electrode connector has an excellent anti-dropping effect, which is more convenient to use. The highly elastic connecting portion is durable, which is economic, thereby improving the usability of the device.

Figure 1:
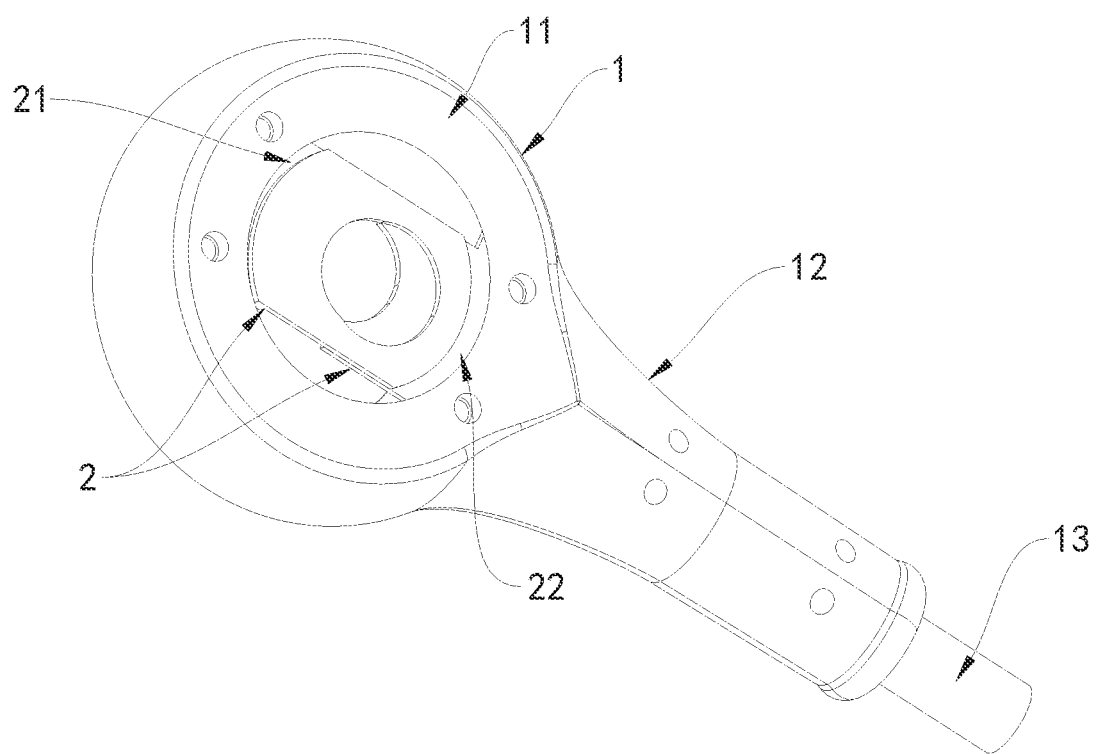
FIG. 1 is a structural schematic diagram of a squeeze-type electrode connector according to one embodiment of the present disclosure.
Figure 2:
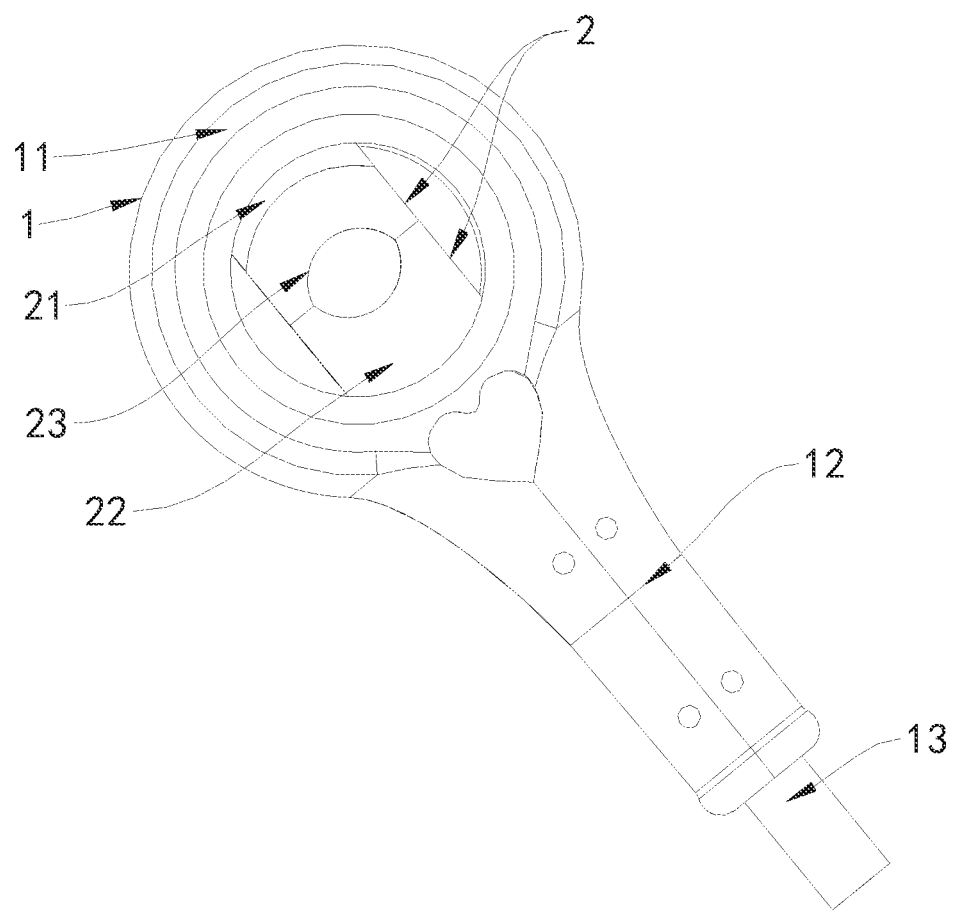
FIG. 2 is a structural schematic diagram of a connecting portion of the squeeze-type electrode connector according to one embodiment of the present disclosure.

REFERENCE NUMBER IN THE DRAWINGS 1. shell; 11. connecting portion; 12. wire tail; 13. conducting wire; 2. clamping portion; 21. first metal sheet; 22. second metal sheet; 23. through-hole; 24. arc-shaped notch.

DETAILED DESCRIPTION OF THE EMBODIMENTS

Technical solutions in embodiments of the present disclosure are clearly and completely described below with reference to accompanying drawings in the embodiments of the present disclosure. Obviously, the embodiments described herein are merely a part of embodiments of the present disclosure, not all of them. Based on the embodiments of the present disclosure, all other embodiments obtained by those skilled in the art without any creative thinking fall within the scope of protection of the present disclosure.

Referring to FIG. 1 to FIG. 4, an embodiment of the present disclosure provides a squeeze-type electrode connector, including a shell 1 and a clamping portion 2. The shell 1 is integrally formed. The shell 1 includes a connecting portion 11 with a cavity defined therein. The cavity has a circular shape. The connecting portion 11 is made of an elastic material.

The clamping portion 2 includes a first metal sheet 21 and a second metal sheet 22, and the first metal sheet 21 and the second metal sheet 22 are disposed on two sides of an interior of the cavity respectively. A through-hole 23 is defined on the first metal sheet 21. The first metal sheet 21 is in staggered contact with the second metal sheet 22. The second metal sheet 22 overlaps a part of the through-hole 23, to allow the through-hole 23 to clamp an electrode sheet. The clamping portion 2 is configured to connect to an ECG monitor, so as to acquire ECG data. Since the connecting portion has certain elasticity, the first metal sheet 21 and the second metal sheet 22 move opposite to each other or move towards each other as the connecting portion 11 is squeezed or rebounds. In this way, the electrode sheet is tightened or loosen by the first metal sheet 21 and the second metal sheet 22 moving towards each other or moving opposite to each other.

Figure 3:
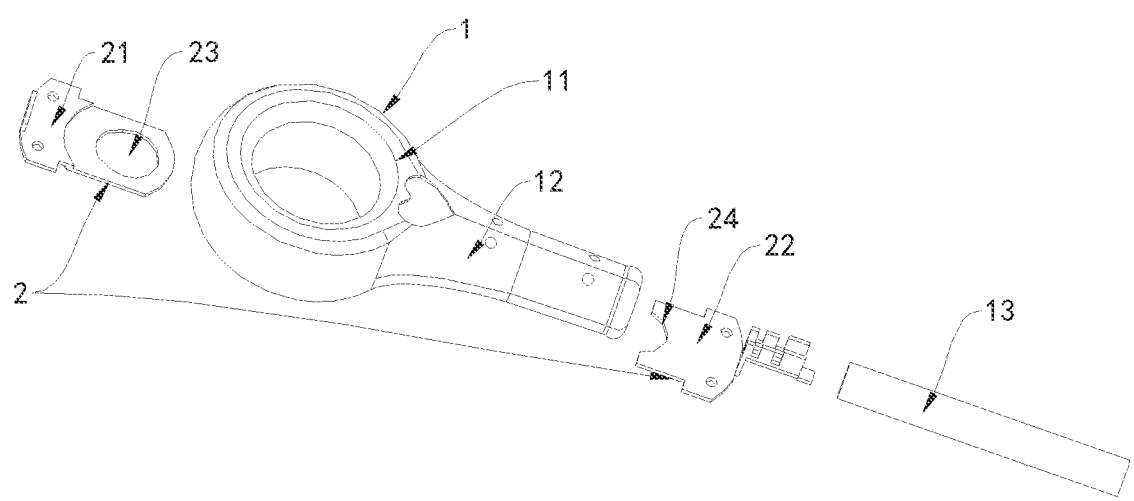
FIG. 3 is an exploded structural schematic diagram of the squeeze-type electrode connector according to one embodiment of the present disclosure.

Referring to FIG. 3, in one embodiment of the present disclosure, the through-hole 23 has an approximately circular shape or an oval shape. An arc-shaped notch 24 is defined at an end of the second metal sheet 22 in contact with the first metal sheet 21. The arc-shaped notch 24 is configured to cooperate with the through-hole 23, so as to clamp the electrode sheet. When the arc-shaped notch 24 on the second metal sheet 22 is not opposite to the through-hole 23, the second metal sheet 22 fails to overlap the through-hole 23 or overlaps a small part of the through-hole 23, which makes a space of the through-hole 23 larger, thereby facilitating a user to insert the electrode sheet in the through-hole 23. After loosening the connecting portion 11, the first metal sheet 21 and the second metal sheet 22 move towards each other, to allow the arc-shaped notch 24 to abut against the electrode sheet in the through-hole 23, thereby realizing clamping and positioning.

Figure 4:
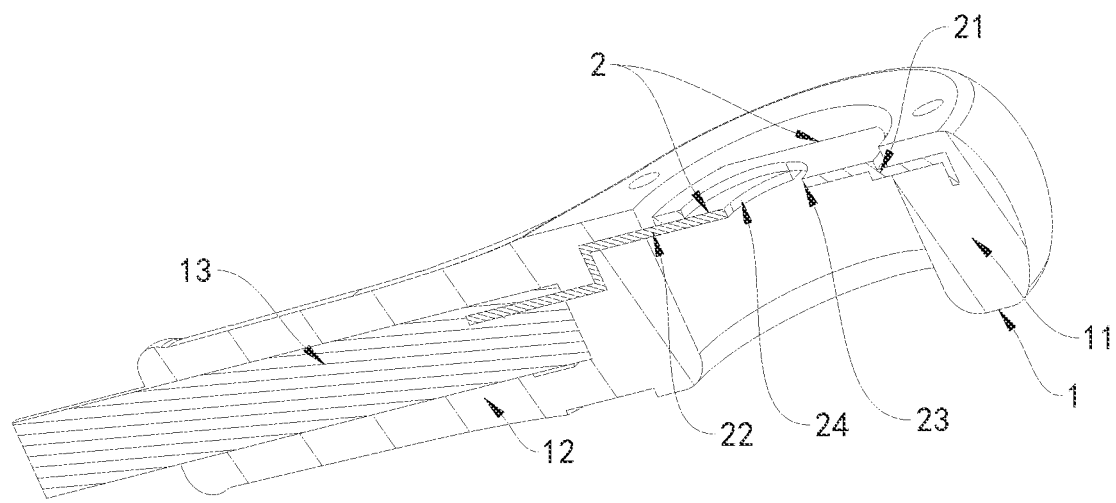
FIG. 4 is a cross-sectional structural schematic diagram of the squeeze-type electrode connector according to one embodiment of the present disclosure.

Referring to FIG. 3 and FIG. 4, in an embodiment of the present disclosure, the connecting portion 11 has a circular external shape or an oval external shape. As such, when two sides of the connecting portion 11 are subjected to a relative pressure, the other two sides move opposite to each other. The connecting portion 11 may have the circular external shape or the oval external shape. In this embodiment, the connecting portion 11 preferably has the circular external shape, which saves the injection molding material and reduces the manufacturing cost. In addition, the squeezed two sides of the connecting portion 11 and the other two sides in cross arrangement with the squeezed two sides need to synchronously perform expansion movements. On the basis of meeting this requirement, the connecting portion 11 having the circular external shape ensures its rebound performance, and at the same time saves the processing material and reduces the process difficulty to the greatest extent, which is economic. Thus, the device has a broad application prospect.

In one embodiment of the present disclosure, the connecting portion 11 is made of an elastic material. The elastic material is one of TPU, TPE and highly elastic silica gel. The TPU, the TPE and the highly elastic silica gel realize the elastic clamping of the connecting portion 11.

In one embodiment of the present disclosure, a wire tail 12 is disposed on the connecting portion 11, and the wire tail 12 is integrally injection molded with the connecting portion 11. An end of the wire tail 12 is connected to a conducting wire 13. An end of the conducting wire 13 is connected to the second metal sheet 22, and the other end of the conducting wire 13 away from the second metal sheet 22 is connected to an ECG monitor or other electrode-related device. The conducting wire 13 is configured to transmit data information on the electrode sheet that is connected to the first metal sheet 21 and the second metal sheet 22. In a case that the end of the conducting wire 13 away from the second metal sheet 22 is connected to the ECG monitor, ECG data of a user is monitored.

When in use, referring to FIG. 1, the connecting portion 11 is squeezed, to be in staggered contact with the first metal sheet 21 and the second metal sheet 22. The deformation of the connecting portion 11 drives the first metal sheet 21 and the second metal sheet 22 to move opposite to each other, so that the arc-shaped notch 24 fails to overlap the through-hole 23. After the connecting portion 11 is loosened, the first metal sheet 21 and the second metal sheet 22 move towards each other, and the second metal sheet 22 overlaps a part of the through-hole 23, so as to allow the through-hole 23 to clamp the electrode sheet, completing the clamping and positioning. The device is operated through the above manner.

In summary, in order to solve the problems that the conventional ECG cables have low service life, inconvenient operation and high manufacturing cost, the squeeze-type electrode connector according to the present disclosure includes the shell 1 and the clamping portion 2. The connecting portion 11 integrally injection molded with the highly elastic material is cooperated with the clamping portion 2 that is capable of performing back-to-back movement or face-to-face movement as the connecting portion 11 is squeezed and rebounds. As such, there is no need for the springs and the clip buttons used in the related art, thereby effectively reducing the process difficulty and the manufacturing cost. Moreover, the squeeze-type electrode connector has an excellent anti-dropping effect, thus is more convenient to use. The highly elastic connecting portion 11 is durable, which is economic, thereby improving the usability of the device.

The squeeze-type electrode connector is applicable to collection of ECG information or other body information, and is also applicable to other application scenarios such as electrode connection, conductivity and testing, etc. For example, it is applicable to electrode connection, conductivity and testing for automobiles or other electronic instruments.

Although the embodiments of the present disclosure have been described, it will be appreciated that, these embodiments may be varied, modified, replaced and altered by those skilled in the art without deviating from the principle and spirit of the present disclosure. The scope of the present disclosure is limited by the attached claims and their equivalents.

What is claimed is:

1. A squeeze-type electrode connector, comprising:
   a shell, wherein the shell comprises a connecting portion with a cavity defined therein, and the connecting portion is made of an elastic material; and
   a clamping portion, wherein the clamping portion comprises a first metal sheet and a second metal sheet, and the first metal sheet and the second metal sheet are disposed on two sides of an interior of the cavity, a through-hole is defined in the first metal sheet, the first metal sheet is in staggered contact with the second metal sheet, and the second metal sheet overlaps a part of the through-hole, to allow the through-hole to clamp an electrode sheet;
   wherein the connecting portion has a circular external shape or an oval external shape;
   wherein the first metal sheet and the second metal sheet are respectively disposed on a first side and a second side of the connecting portion, and wherein in response to a third side and a fourth side of the connecting portion being squeezed to generate a deformation configured to drive the first metal sheet and the second metal sheet to move away from each other so that the second metal sheet no longer overlaps the through-hole thereby allowing an electrode sheet to be inserted into the through-hole, and wherein in response to the connecting portion being released, the first metal sheet and the second metal sheet are operative to move towards each other so that the second metal sheet partially overlaps the through-hole thereby allowing the through-hole to clamp the electrode sheet; wherein a line connecting the first side and the second side of the connecting portion is substantially perpendicular to a line connecting the third side and the fourth side of the connecting portion.

2. The squeeze-type electrode connector according to claim 1, wherein an arc-shaped notch is defined at an end of the second metal sheet in contact with the first metal sheet.

3. The squeeze-type electrode connector according to claim 1, wherein the connecting portion has a circular external shape or an oval external shape.

4. The squeeze-type electrode connector according to claim 1, wherein the cavity has a circular shape.

5. The squeeze-type electrode connector according to claim 1, wherein the shell is integrally formed.

6. The squeeze-type electrode connector according to claim 1, wherein the elastic material is one of thermoplastic polyurethanes (TPU), thermoplastic elastomer (TPE) and highly elastic silica gel.

7. The squeeze-type electrode connector according to claim 1, wherein a wire tail is disposed on the connecting portion, wherein the wire tail is integrally injection molded with the connecting portion; and an end of the wire tail is connected to a conducting wire.

* * * * *